United States Patent [19]

Lotti

[11] 4,234,279
[45] Nov. 18, 1980

[54] AUTOMATIC APPARATUS FOR DISCHARGING LOOSE PRODUCTS IN BINS

[75] Inventor: Nevio Lotti, Cesena, Italy
[73] Assignee: Sorma S.n.c. di Pieri-Lotti & C., Cesena, Italy
[21] Appl. No.: 968,984
[22] Filed: Dec. 13, 1978
[30] Foreign Application Priority Data
Jun. 29, 1978 [IT] Italy .................. 3482 A/78
[51] Int. Cl.³ .................. B65G 60/00; B65G 65/34
[52] U.S. Cl. .................. 414/33; 414/413; 414/414
[58] Field of Search .......... 414/32, 33, 414, 420, 414/421, 422; 221/190

[56] References Cited
U.S. PATENT DOCUMENTS

| | | | |
|---|---|---|---|
| 2,161,836 | 6/1939 | Stevenson | 414/413 X |
| 2,670,091 | 2/1954 | Sinks | 414/414 |
| 3,013,680 | 12/1961 | Paxton | 414/414 |
| 3,583,579 | 6/1971 | Triggs et al. | 414/413 X |
| 3,767,073 | 10/1973 | DeGreef | 414/414 |

Primary Examiner—L. J. Paperner

[57] ABSTRACT

An automatic apparatus for discharging loose products, such as fruit, vegetables and the like, contained in the generously dimensioned crates that are commonly known as "bins", are open at the top and have their lower part provided with a support plate in the form of a pallet. The apparatus consists essentially of: a lower full bin infeed platform connected to a de-stacker group that progressively reduces a number of bins placed, for example by a fork lift truck, on the lower platform and feeds them, one at a time and one after the other, to an oscillating frame provided to tip the individual bins through more than 90° until they have been completely emptied; and an upper platform, positioned above the one to which prior reference has been made, onto which the emptied bins pass, this being connected to a stacker group, the purpose of which is to form the empty bins into piles which are then picked up and are sent back to be filled anew.

17 Claims, 20 Drawing Figures

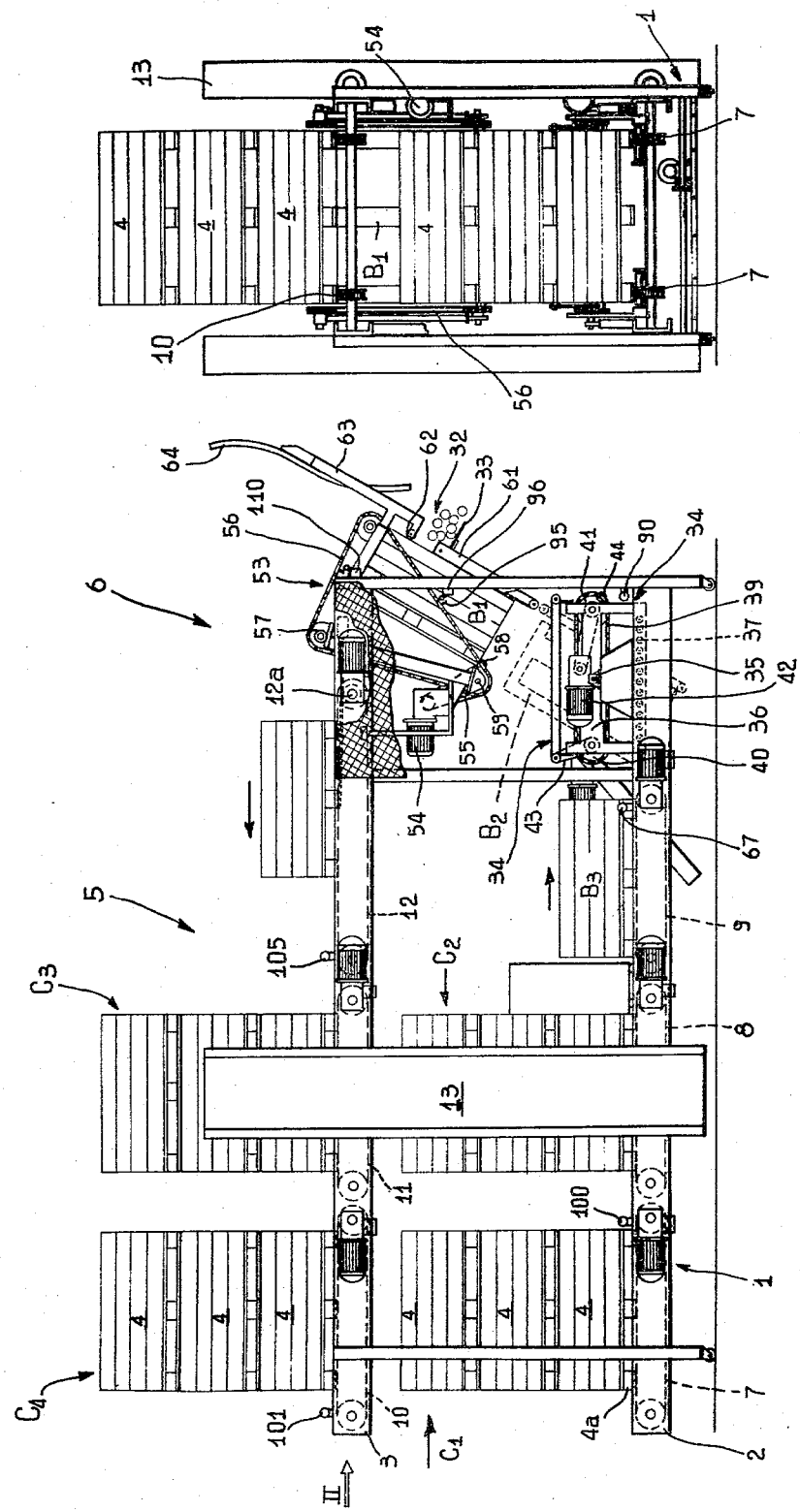

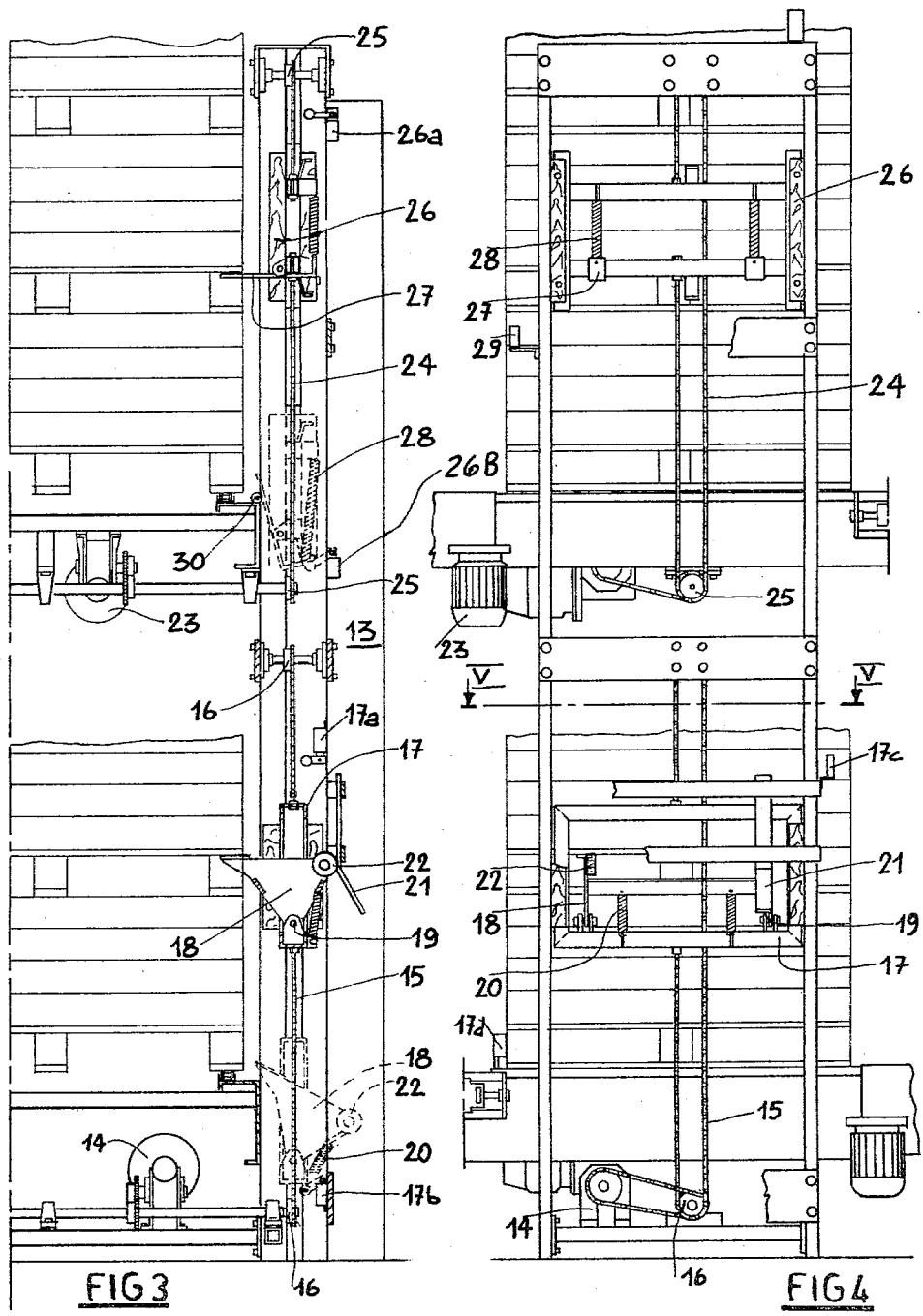

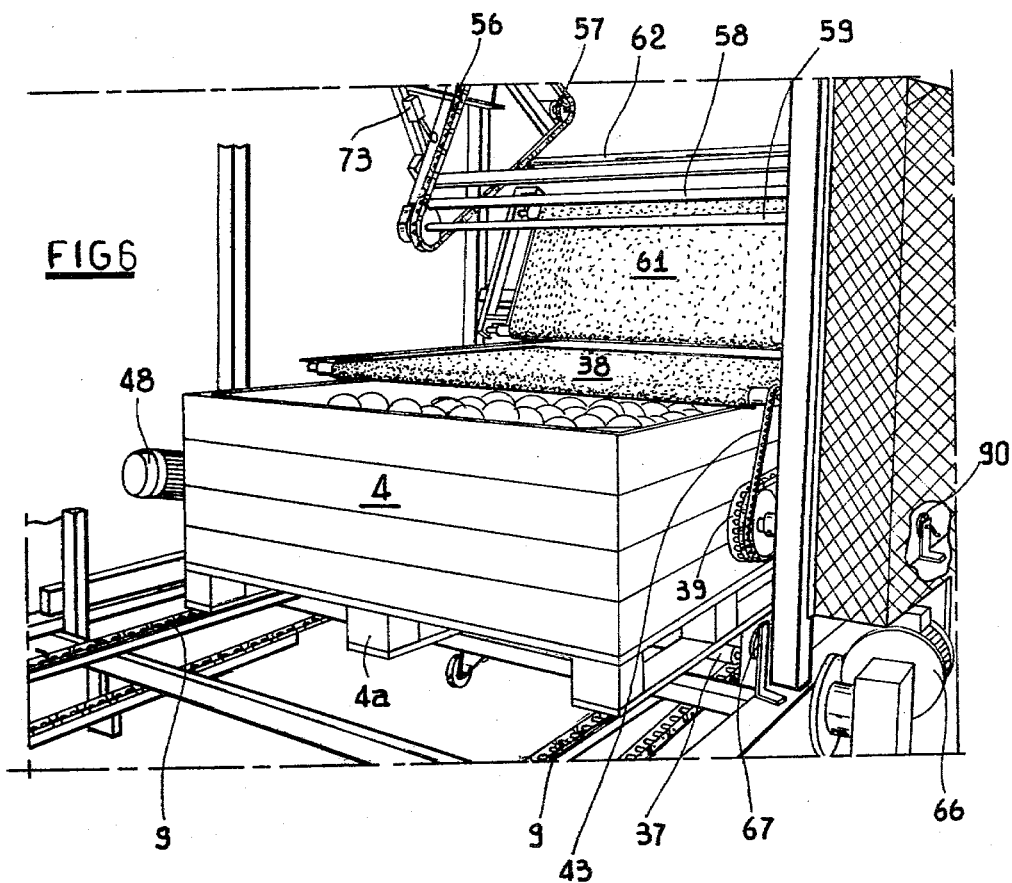
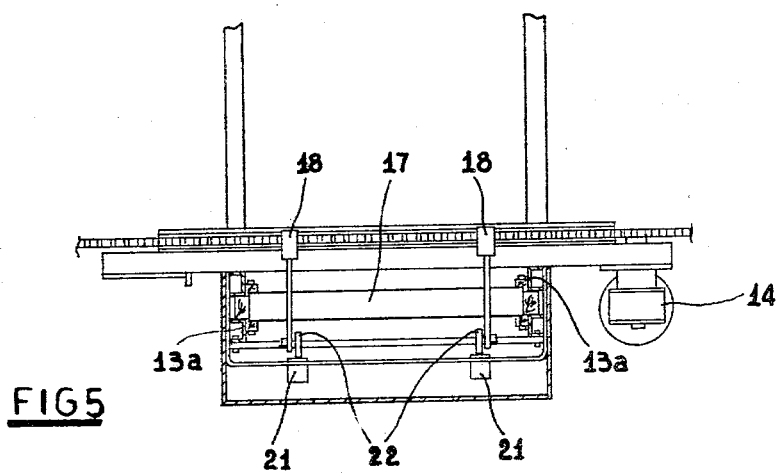

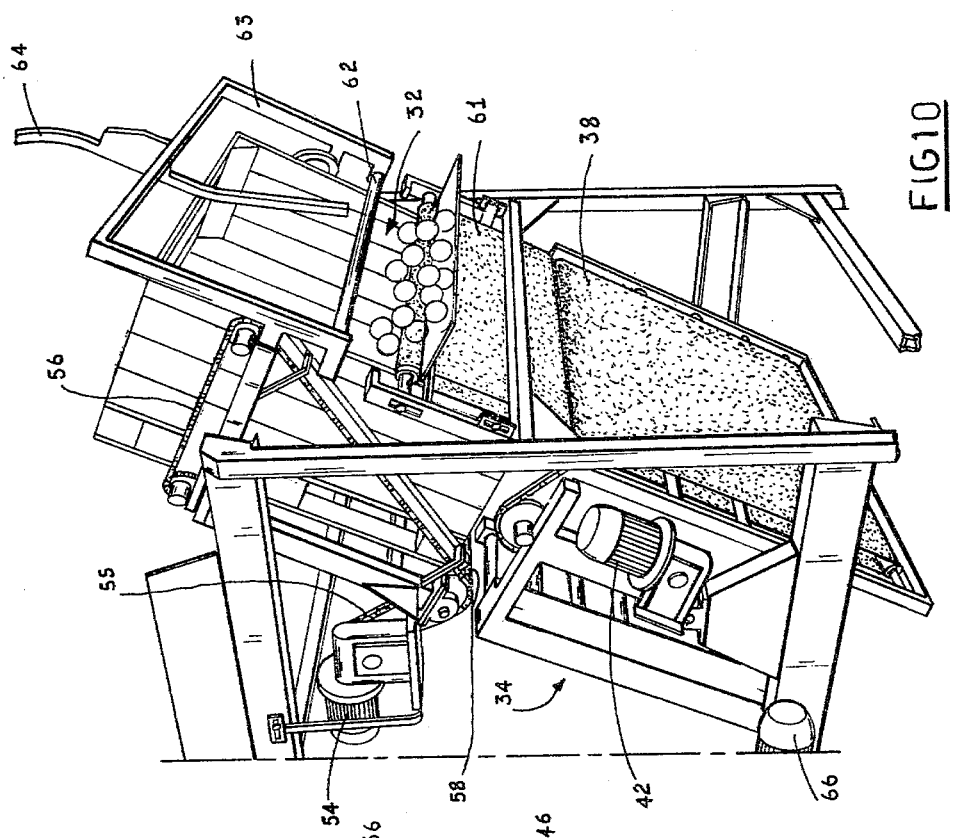
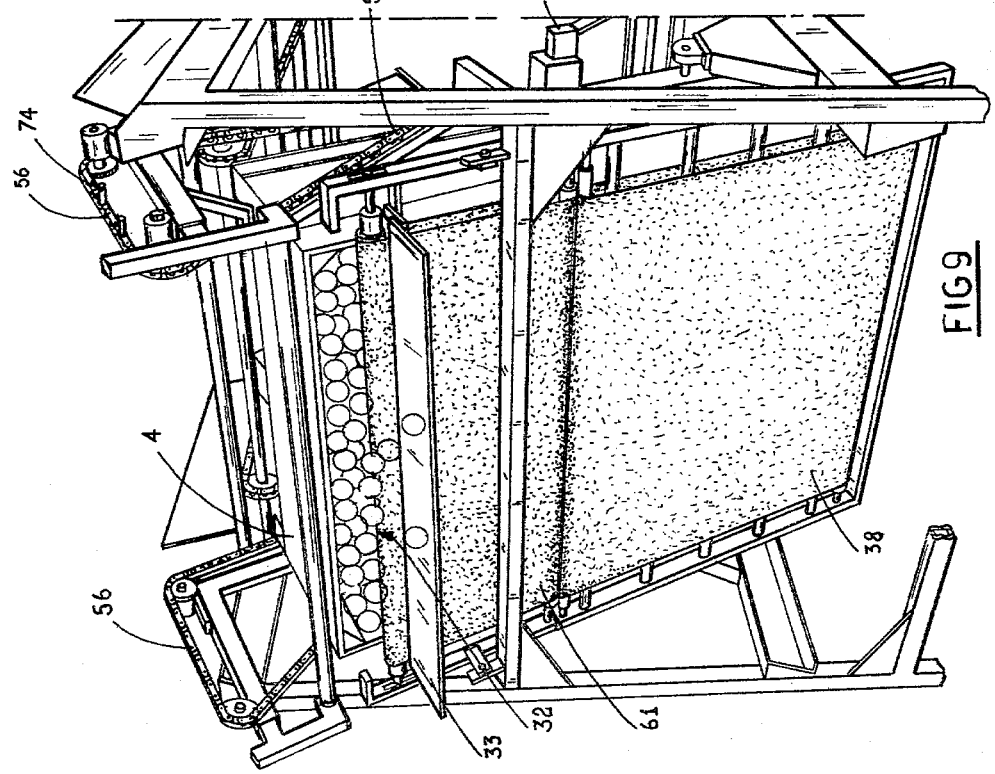

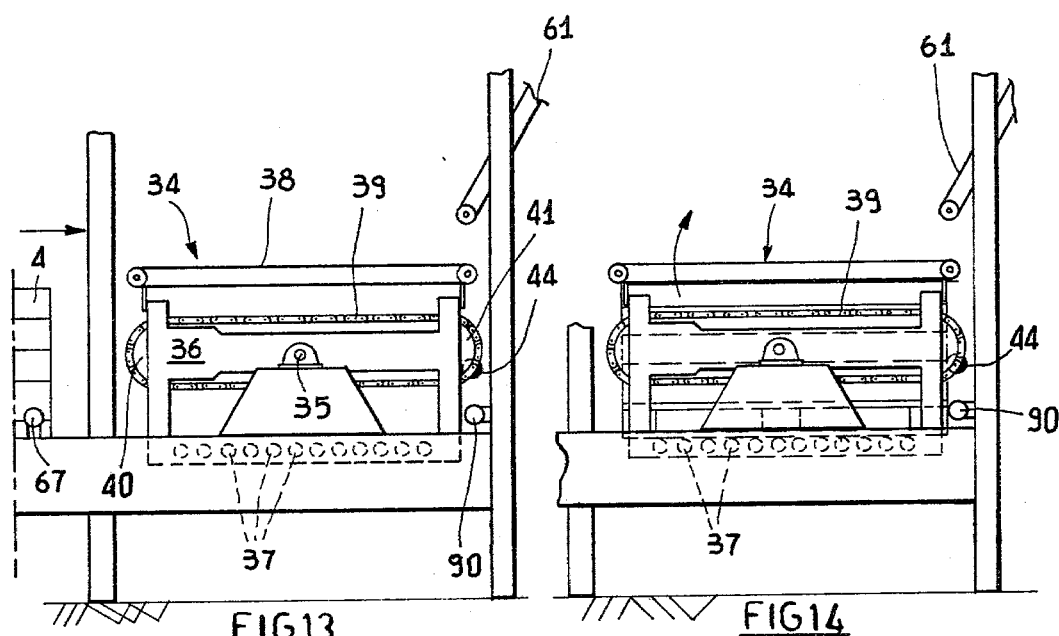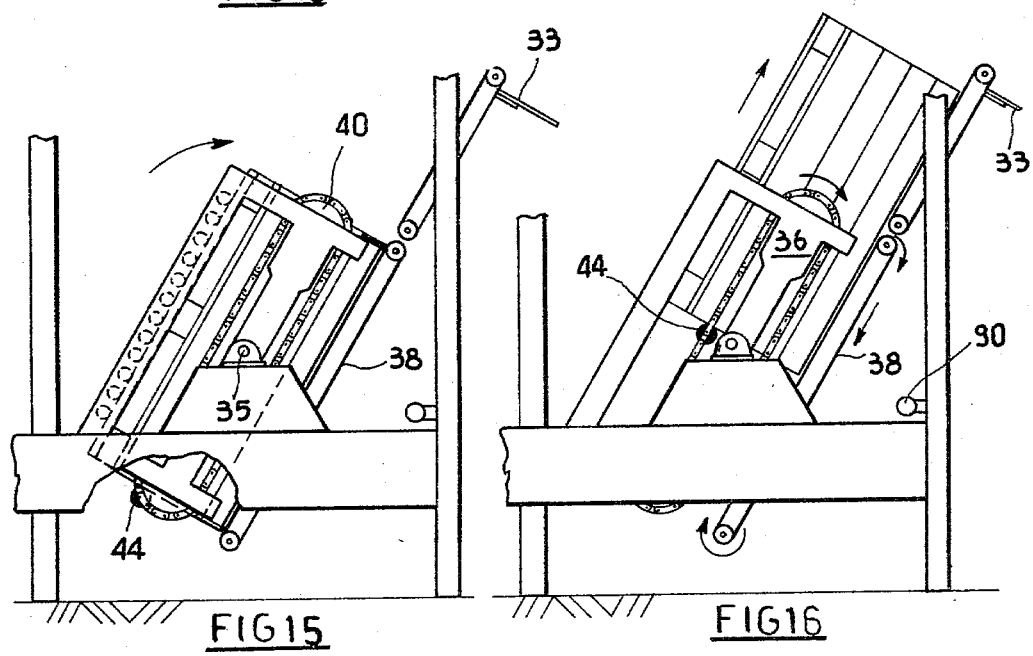

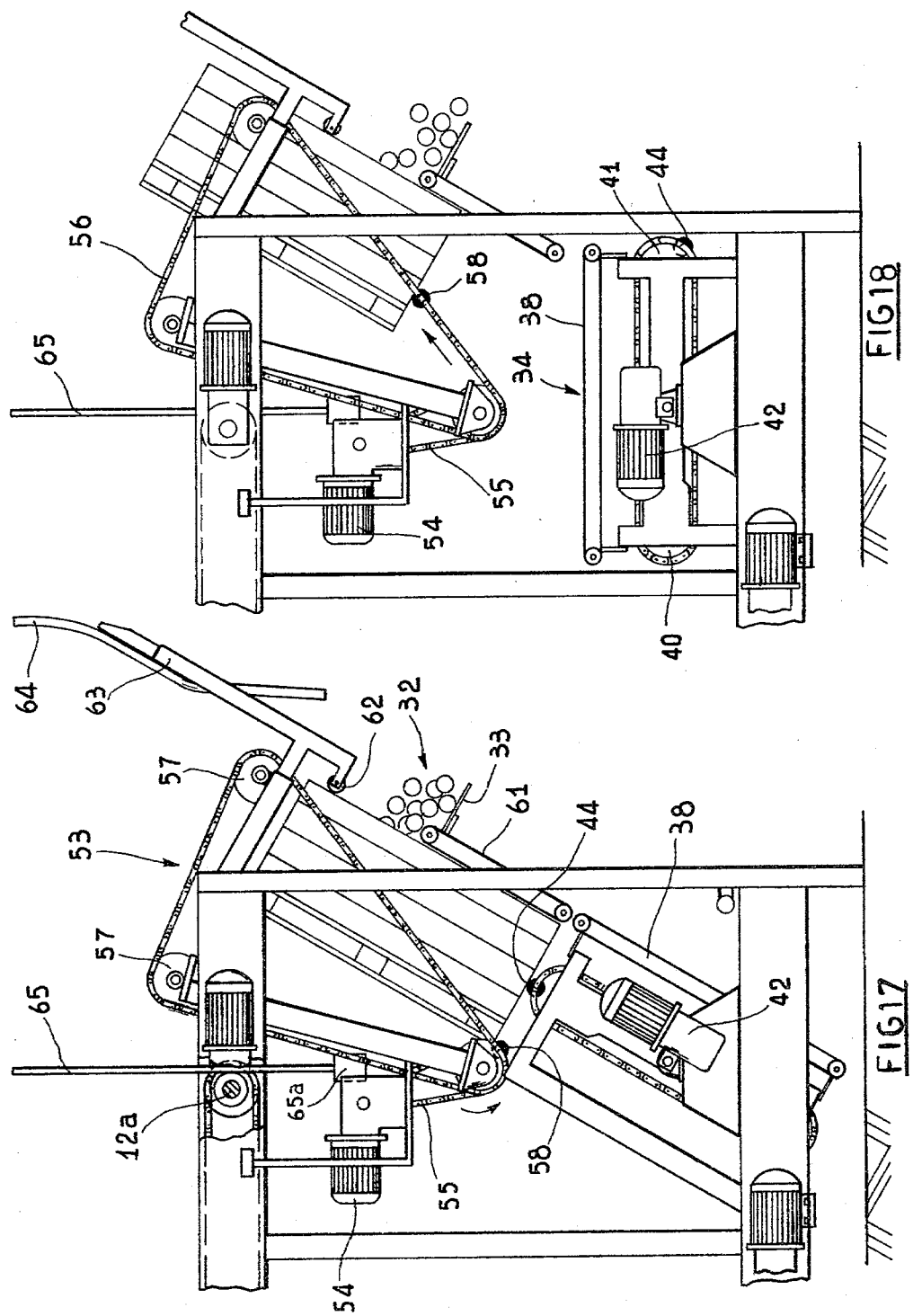

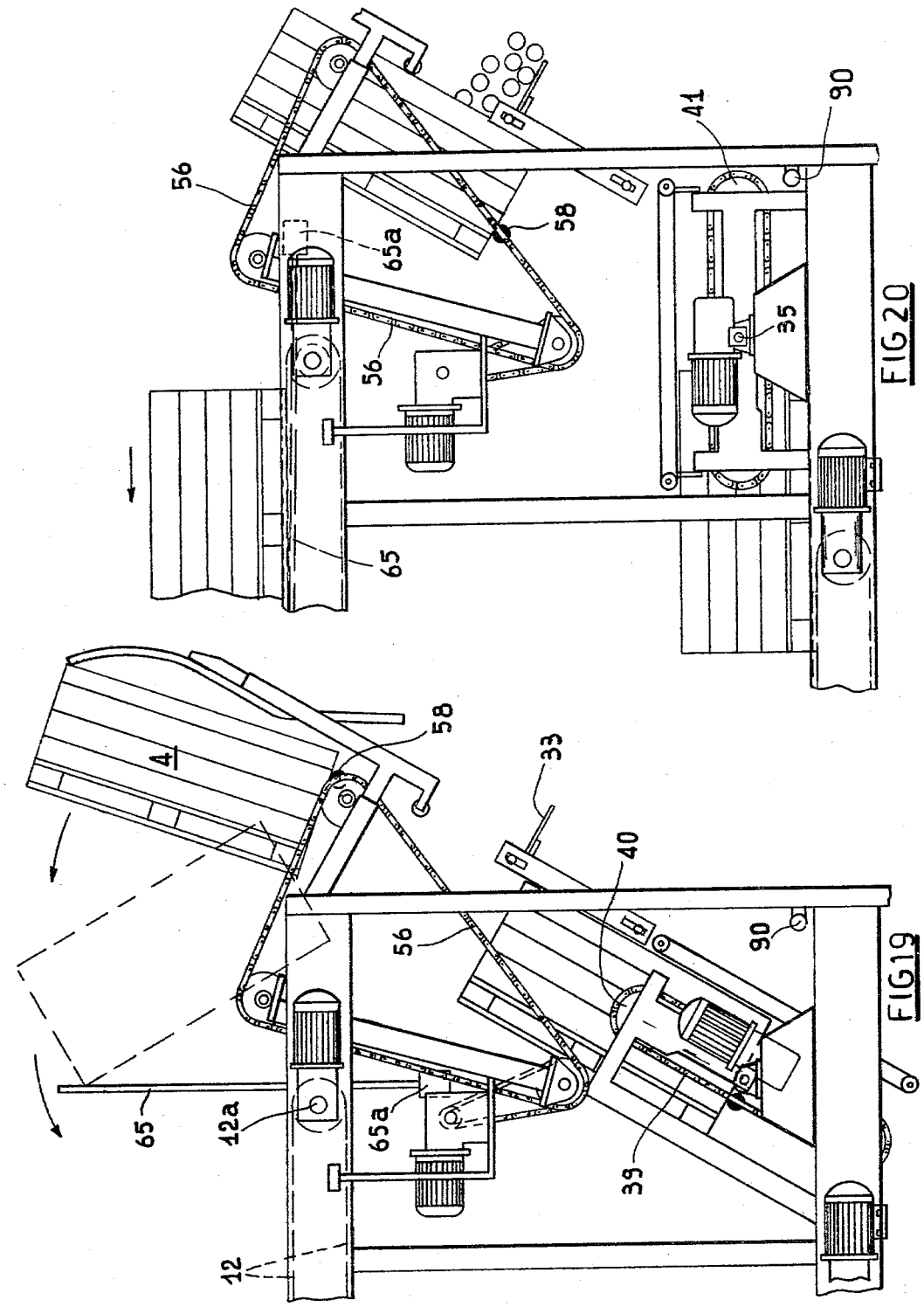

AUTOMATIC APPARATUS FOR DISCHARGING LOOSE PRODUCTS IN BINS

BACKGROUND OF THE INVENTION

This invention relates to an automatic apparatus for discharging loose products contained in bins, particularly fruit, vegetables and similar.

DESCRIPTION OF THE PRIOR ART

As is known, when fruit or the like is picked, it is generally put into wooden crates, commonly known as "bins", that are open at the top and have on their lower part projections designed to create a support plate that is integral with the remaining parts of the container and is substantially identical to the known "pallet".

In this way the bins, the dimensions of which are considerable ($1 \times 1 \times 0.54$ m for example) can be easily transferred with the aid of the customary fork lift trucks.

The procedure for discharging the bins is, at the present moment, essentially manual, angling them suitably in such a way as to cause the products held therein to drop out by gravity.

Use is also made, in certain cases, of lifting and tipping equipment in order to alleviate the energy expended by the persons carrying out this type of work.

In any event, however, the charging and the discharging of the bins, normally required to select the fruit involves, as currently carried out, a number of very awkward and tiring operations which, moreover, necessitate use being made of a large number of hands.

Furthermore, with the systems at present in use, the discharged products can get knocked or squashed, thereby often damaging them irreparably, particularly in the case of easily deteriorating fruit.

SUMMARY OF THE INVENTION

The main object of the present invention is to make available an apparatus through which the discharging of bins can take place in a fully automatic fashion, with the bins being so arranged economically that a high degree of efficiency is ensured and that by being discharged gradually, the delicate handling of the products be made certain.

Another important object of the invention is to make available an apparatus which, besides determining the automatic discharge of the bins, angles them and tips them suitably, and removes the individual bins in such a way as to achieve continuous automatic operation with really limited waiting times.

These and other objects too, which will emerge from the following detailed description, have been attained with the apparatus according to the invention, essential features of which are that it comprises, on a fixed frame:

a lower platform for infeeding of the full bins and an upper platform for discharging the empty bins;

an oscillating frame for receiving the full bins, this frame being positioned in the region of the lower platform and able to be tipped alternately from a virtually horizontal non-operative position in alignment with the lower platform, to a position in which the discharge of the products contained in the bins is prepared, this latter position requiring a rotation of more than 90° with respect to the non-operative position;

means for causing the oscillating frame to be tipped in one direction or the other;

means mounted on the oscillating frame for restraining the products inside the bins at the time the frame is in the inclined position;

first transfer means mounted on the oscillating frame for lifting the full bins while the frame is in the inclined position;

a fixed discharge aperture placed a certain height above the oscillating frame, in alignment with the open side of the bins when they are in the inclined position in which the products are discharged;

second transfer means mounted on the fixed frame, above the said oscillating frame, for lifting the bins further up and tightly against the discharge aperture, after the lifting operation performed by the first transfer means;

locator means placed in the region of the second transfer means and the upper discharge platform, for overturning the empty bins from the inclined position to the virtually horizontal position, above the upper platform, in which the orientation of the empty bins corresponds to that of the full bins being fed in;

and means for detecting the various positions adopted gradually by the bins, so as to coordinate the operation of the transfer means and the means for tipping the oscillating frame.

In order that it be possible to smoothly charge and discharge the apparatus with bins arranged in stacks, a further characteristic of the invention envisages the apparatus as also comprising: a full bin de-stacker group, placed upstream with respect to the oscillating frame, in the region of the aforementioned lower infeed platform, for supplying the above mentioned oscillating frame with one bin at a time, taken from a stack of full bins deposited on the lower platform; a stacker group for the empty bins, placed in the region of the upper empty bin discharge platform, for forming the individual empty bins, lifted up by the second transfer means, into stacks above the upper platform; the groups comprising essentially horizontal conveyor belts, provided with an inching motion, in the region of the lower and the upper platform; and a lifting mechanism that cooperates with the conveyor belts in order to vertically lift and/or lower the bins into the feeding and the discharge position, respectively.

In this way, the apparatus according to the invention carries out the entire operating cycle in a fully automatic fashion, removing the full bins stacked up on the lower platform, one at a time, then angling them and lifting them so as to cause the products to be discharged through the aforementioned discharge aperture, and finally turning the emptied bins over so as to replace them in their original orientation, for them to be subsequently stacked on the upper platform.

The apparatus according to the invention, therefore, completes all the various operating phases without any manual assistance, it only being necessary to deposit stacks of filled bins onto the lower platform and to clear the stacks of empty bins from the upper platform. The latter operations can be carried out with the aid, for example, of ordinary fork lift trucks for pallets and the like.

BRIEF DESCRIPTION OF THE DRAWINGS

Further characteristics and advantages of the invention will emerge from the following detailed description of a preferred, but not the sole embodiment for an automatic apparatus for discharging fruit or the like contained in bins, illustrated purely as an example with reference to the accompanying drawings, in which:

FIG. 1 is a lateral view of the apparatus according to the invention;

FIG. 2 is a front view of the apparatus, seen as indicated by the arrow II in FIG. 1;

FIGS. 3 and 4 show, in a partial front view and in a lateral view, respectively, the mechanism for operating the stacker group and the de-stacker group;

FIG. 5 is a horizontal section along the line V—V in FIG. 4;

FIG. 6 shows, in a perspective view, the insertion phase into the oscillating frame of the apparatus of a bin;

FIG. 9 shows, in a perspective view, the initial phase for lifting a bin.

FIGS. 10, 11 and 12 show, in perspective view, the subsequent phases for lifting a bin, from different viewpoints;

FIGS. 13 to 20 show, diagrammatically, the operating sequence for a complete bin tilting, lifting and discharging cycle.

DESCRIPTION OF THE PREFERRED EMBODIMENT

Figure 7:
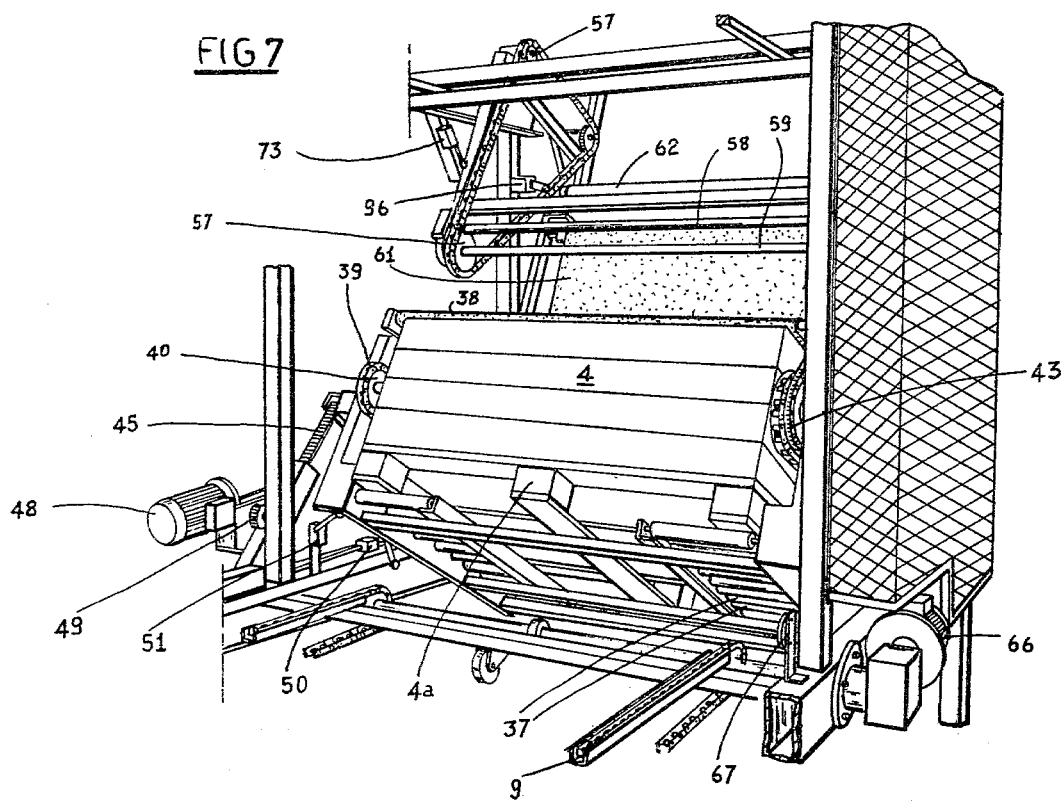
FIG. 7 shows, in a perspective view, the phase of tipping the oscillating frame in which a bin is housed.

With reference to the figures, the apparatus according to the invention comprises a fixed frame, shown at (1), that carries a lower horizontal infeed platform (2) and an upper horizontal discharge platform (3), the platforms being superposed one over the other and interspaced in such a way as to allow stacks of two, three or more bins (4) to be deposited onto the lower platform (in the example illustrated stacks of three bins are envisaged).

The bins are of the type used to contain fruit, and they are open at the top and have projections (4a) and spaces in the form of a pallet on their bottom part.

The apparatus is provided with a section (5) (FIG. 1) intended for depositing the stacks of filled bins and for removing the stacks of empty bins, and a section (6) intended for tipping, lifting and discharging the bins.

In the event of individual bins being fed in instead of stacks, the apparatus is envisaged to be constituted just by the section (6) even though the preferred form of embodiment does contemplate there being both the sections (5) and (6).

The horizontal platforms (2) and (3) are constructed as sliding surfaces since they are equipped with continuous chain conveyors or the like.

To be more precise, in the region of the lower platform (2) there are three conveyors (7), (8) and (9) (FIG. 1) placed one on the extension of the other, and each of these is, out of preference, made with a pair of chains mounted on corresponding gears and is suitably driven. The conveyor belts, which can be operated one independently of the other, cover the full length of section (5) of the apparatus.

Likewise, in the region of the upper platform (3) three more conveyors, (10), (11) and (12), are mounted, these being constructed in the same way as outlined for the conveyors (7), (8) and (9) and placed one on the extension of the other, it being possible to operate them independently.

The conveyors (10), (11) and (12) stretch over the full length of section (5) and the conveyor (12) is extended so that, as shown in FIG. 1, it also covers a part of section (6).

Means for lifting and lowering the bins are installed at the sides of the intermediate conveyors (8) and (11), and these are constituted by a de-stacker group that operates in the region of the lower platform (2), and by a stacker group that operates in the region of the upper platform (3); the groups being mounted at points corresponding to where the lateral stanchions (13) (FIGS. 1, 3 and 4) are positioned.

Each stack of full bins is first placed on the conveyor (7) by a fork lift truck, and it is then moved automatically onto the intermediate conveyor (8) on which, through the operation of a suitably set photoelectric cell, it remains stationary. At this point, the de-stacker group comes into operation and allows the undermost bin to go forward towards the next conveyor (9). As will be seen in due course, this operation is repeated until all the bins in the stack have been sent forward.

FIGS. 3, 4 and 5 clearly show that the de-stacker group comprises a motor assembly (14) which, through suitable gearing, operates two chains (15) placed on one side and the other of the bins, and mounted on corresponding gearwheels (16) in a way whereby it will be possible for them to be displaced vertically.

The chains are individually secured to corresponding slides (17) which can travel vertically guided in slideways (13a) (FIG. 5) integral with the stanchions (13). The two slides (17) are aligned horizontally and they are raised and lowered simultaneously, thereby causing the motor (14) to be operated.

Each slide (17) is constituted by a rectangular frame and, furthermore, supports two brackets (18) that are integral with one another and are pivoted at (19) to the frame so as to be able to oscillate around a horizontal axis.

The commencement of the cycle occurs through the operation of a photocell (17c) (FIG. 4) that signals the arrival in position of a stack ($C_1$) of bins on the conveyor (8) and causes it to be halted and the slides (17) to be lifted; furthermore, it causes the conveyor (7) to be halted should the presence thereon of a subsequent stack ($C_2$) be detected by a photocell (100).

Under non-operative conditions, the brackets (18) are kept in the open position, or in other words, displaced towards the outside as shown with dashes in FIG. 3, under the action of springs (20), while the fixed cams (21), the height of which can be adjusted to suit that of the bin, by engaging with the rollers (22) carried by the said brackets, compel the latter to adopt the closed position, when they are raised immediately above the lowermost bin.

In this condition, the brackets (18) are inserted underneath the base of the bin that is superposed on the one at the bottom of the stack, as shown in FIG. 3, thus allowing the two upper bins (in the event of the stack consisting of three bins) to be raised slightly, until the slides (17) come into contact with a microswitch (17a) which gives the consent to the conveyor (8) for the bin above it to be forwarded towards the section (6) but only when this has been declared free following a check made by a photocell (67).

A photocell (17d) (FIG. 4) placed along a diagonal line with respect to the bin on the conveyor (8) then detects whether bins are not present immediately above the conveyor (8) causing the latter to be halted and, contemporaneously, the motor (14) to be set in operation in such a way that the two upper bins just lifted are lowered until the bottom bin rests on the conveyor (8). Once the bin is resting thereon, a further downward motion on the part of the brackets (18), which up until that time had been sustaining the bins, brings about their disengagement from the bins and, through the action of the springs (20), a return to the open position, as shown with dashes in FIG. 3.

Immediately afterwards the brackets (18) are lifted again, through the action of a microreversing switch (17b), until they engage once more with the fixed cams (21) which return them to the closed position so as to engage them with the base of the one single bin that is still superposed, which is now positioned above the one that is resting on the conveyor (8); the upper bin is then, in turn, lifted slightly in order to allow the lower bin to be sent forward towards section (6).

Subsequently, the last bin in the previous stack is lowered until it rests on the conveyor (8), and is sent onto section (6), thereby freeing the photocell (17c) and causing the conveyor (8) to be made ready to accept a fresh stack arriving from the preceding conveyor (7), and thus the cycle to be repeated.

The inversion in the movement of the slides (17) is actuated by microlimit switches (17a) and (17b) being tripped by one or the other of the slides.

The stacker group placed in the region of the upper platform (3) operates inversely and forms the emptied bins into stacks as they are gradually discharged one at a time from section (6), as will be seen hereinafter.

In common with the description given above, the stacker group comprises a motor (23) which, through suitable gearing, operates two lateral chains (24) wound around the corresponding gearwheels (25) and displaceable vertically (FIGS. 3 and 4).

The chains are secured to two vertically movable slides (26) and they carry the oscillating "L" shaped brackets (27) which, through the action of the springs (28), are made to project towards the bins.

When in the protruding position, the brackets (27) engage with the base parts of the bins and make it possible to lift them.

More precisely, with the arrival on the conveyor (11) of a first bin coming from section (6), a photocell (29) (FIG. 4) causes the conveyor (11) to halt and, at the same time, places the motor (23) in operation in such a way as to lift the slides (26) which had been previously lowered into the position shown with dashes in FIG. 3. The brackets (27), which were previously in the open position, by engaging with the rollers (30) (FIG. 3), are now carried into the insertion position, under the action of the springs (28), and they lift the bin until the slides (26) trip a microreversing switch (26a) (FIG. 3).

In this position, the photocell (29) is freed and the conveyor (11) is then allowed to send forward a second bin discharged from section (6) which, in turn, halts under the action of the photocell (29), which, in this case, brings about the downward motion of the slides (26).

This latter bin is then inserted underneath the first bin, and the latter is subsequently made to sink slightly so that it rests on the second bin.

After this, the brackets (27) continue to move downwards and to rub against the external sides of the second bin (this causing the brackets to be placed in the open position shown with dashes in FIG. 3), until the slides (26) trip the microlimit switch (26b), which reverses their movement.

The slides (26) then resume an upward motion, and the brackets (27) adopt their projecting position so as to lift both bins in such a way as to allow a third bin coming from the conveyor (12) to be inserted underneath them. The two previously lifted bins are then rested on the third bin, and thus a stack ($C_3$) is completed.

The completion is signalled by the photocell (31) (FIG. 4) which then halts the motor (23) (once the slides have reached their lowest possible position), and sets in motion the conveyor (11) provided that the photocell (101) is not obscured by the presence of a stack ($C_4$). Then, if the conveyor (10) is free, the stack ($C_3$) is sent forward to the discharge position and is blocked there by the photocell (101).

Provision is made in section (6) of the apparatus for the tipping of the bins and the discharging of the products contained therein, the latter operation being performed via a fixed discharge aperture (32) positioned at a given height and provided with a chute (33) that protrudes from the terminal part of the apparatus itself.

In the lower part of section (6) there is an oscillating frame, shown at (34), and able to turn over around a fixed horizontal axis (35) placed perpendicularly with respect to the direction in which the bins move forward on the lower platform (2).

When in a first non-operative position, the oscillating frame is arranged horizontally in alignment with the lower platform (2), in a way such as to be able to accept a bin made to move forward by the conveyor (9).

The dimensions of the frame, the conformation of which is that of a cage, are such as to precisely encompass a bin at its sides, base and open top.

The oscillating frame (34) is, to be more precise, constituted by two side pieces (36), substantially of "H" shape, pivoted at corresponding fixed points that define the aforementioned axis (35) and supporting, at the bottom, a roller surface (37) designed to be aligned, in the non-operative position, with the upper portion of the conveyor (9) and, at the top, a continuous belt (38), parallel to the roller surface (37), arranged in such a way as to constitute a cover for the bins, in order to prevent the products contained therein from overspilling during the phases that precede their discharge.

Furthermore, the side pieces (36) support corresponding endless chains (39) that are placed in a midway position with sections thereof parallel to the belt (38) and to the roller surface (37), the chains turning around pairs of gearwheels (40) and (41).

The two gearwheels (40), which in the non-operative position of the frame (34) are pointing towards section (5), are mounted rotatably to idle independently on the respective side pieces (36), so as to allow a bin to be inserted in between them, while the other two gearwheels (41) are keyed onto one single horizontal shaft which, through gearing provided, is placed in rotation by a motor (42) (FIG. 10) which is also mounted on the oscillating frame (34).

The belt (38) takes its motion from the movement of the chains (39) through a chain drive (43) (FIGS. 1 and 6), and it has to move in step with the chains (39), at their speed.

The two chains (39) have, furthermore, fixed to them transversely, a bar (44) that is arranged parallel to the tipping axis (35), the purpose of which is to engage with the ends of the bins in order to push them upwards, as will be seen in due course.

The oscillating frame (34) is designed to be tipped alternately between two positions, that is to say, a non-operative position in horizontal alignment with the conveyor (9), and an inclined position, rotated through more than 90° (preferably some 120°) with respect to the non-operative position.

Figure 8:
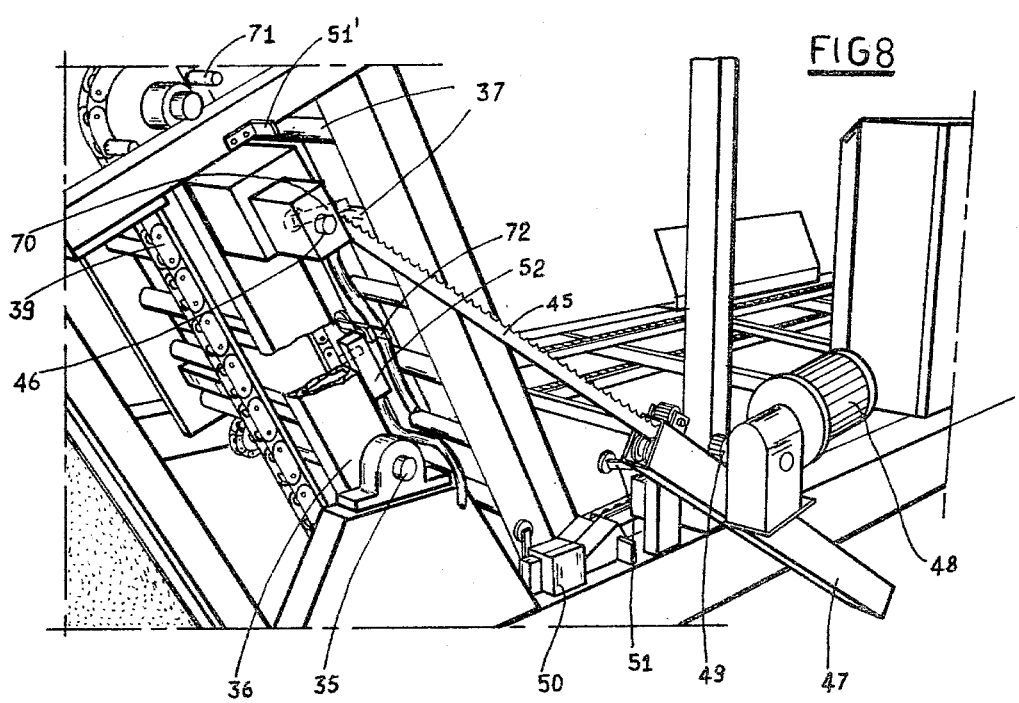
FIG. 8 shows, in a perspective view, the mechanism for tipping the oscillating frame.

This tipping movement can be achieved with various devices, including, for example, the one shown in FIG. 8.

In the stated example there is a rack (45), one extremity of which is articulated at (46) to one of the two side pieces (36) of the frame (34), eccentrically with respect to the tipping axis (35).

The rack (45) is mounted in a sliding fashion in the inside of an encased tubular member (47) that is provided internally with rollers to assist the sliding motion and is supported by the fixed frame in a way whereby it is able to oscillate around a horizontal axis.

The tubular member (47) is, furthermore, integral with a motor assembly (48) which, through a reduction gear, carries in rotation a horizontal axis pinion (49) that meshes with the toothing on the aforementioned rack (45).

When, therefore, the motor is operated in one direction or the other, the rack (45) causes the oscillating frame to be tipped in such a way as to alternately place it in the horizontal position and in the inclined position, respectively, the latter corresponding to the configuration illustrated in FIG. 8.

When the oscillating frame (34) reaches the inclined position, a microswitch (50) (FIG. 8) halts the movement thereof and, contemporaneously, sets in motion the motor (42) which causes the chains (39), and through the drive (43) also the belt (38) to move.

When, instead, the frame (34) reaches the horizontal non-operative position, through a projection (51'), it engages with a microswitch (51) (FIG. 8) integral with the fixed frame, and this halts the motor (48) and thus the frame in the position adopted. Another microswitch (70), which can be seen in FIG. 8, integral with the frame (34), is tripped by the projections (71) (small bolts, for example) fixed suitably spaced, on a section of the chains (39), in order to cause, through a timer, the intermittent operation of the motor (42) that carries the chains in motion.

This serves to cause the bins to be lifted with an intermittent movement so that, as will be explained in due course, the products are discharged in a constant, functional, manner.

The chains (39) and the motor (42), together with the transversely mounted bar (44) integral with the said chains, constitute the first lifting means that push the bins upwards (with the bar (44)), once the frame (34) is in the inclined position.

Furthermore, one of the chains is integral with a projecting rod (72) (seen in FIG. 8) which, at a given moment (in the inclined position of the frame (34)), trips a microswitch (52) (FIG. 8), which brings into operation the second lifting means, shown at (53), mounted above in section (6) of the apparatus.

More precisely, the second lifting means comprise a motor assembly (54) which, through the gearing (55), drives a pair of endless chains (56) placed so as to lie vertically at the two sides of the apparatus, horizontally aligned one with the other, and each turning around three gearwheels (57) supported by the fixed frame, in such a way that both chains define one and the same triangular path. The lower portions of the chains (56) are arranged diagonally so as to be adjacent to the sides of the bins during the lifting phase. A transversely mounted bar (58) is fixed to the two chains (56), and just as with the bar (44) fixed to the chains (39), this serves to push the bins upwards, as will be explained better later on.

The lower gearwheels (57) are keyed onto a horizontal shaft (59) (FIGS. 1, 6 and 7) carried in rotation, through the gearing (55), by the motor (54), and supported by the fixed frame in an external position with respect to the path followed by the bins during the lifting phase.

Obviously both the chains (39) and the chains (56) are provided with fixed means (not shown in the drawings) which trip a microswitch in order to halt the chains, and in particular the bars (44) and (58), in the cycle commencement position.

Just as in the case of the chains (39), the chains (56) are also provided with projections (74) (see FIG. 9), that are spaced and engage with a microswitch (73) (seen in (FIG. 7) in order to cause, through a timer (which can be the same one utilized for the inching movement of the chains (39)), the motor (54) to operate intermittently, so that the lifting of the bins carried out by the device (53) can also be, in the interest of economically discharging the products, intermittent.

The same fixed means for commencing the cycle of the chains (56) then subsequently come into contact with a microswitch (110), at a point corresponding to where the tipping of the bin ($B_1$) commences, for the same to be returned to a horizontal position on the upper platform (3). The microswitch (110) causes the speed of the motor (54) to be increased in order to carry the bar (58) (now freed from the bin) back to the cycle commencement position as rapidly as possible, since the chains (56) are considerably longer than the chains (39).

If required, however, the chains (39) and (56) can also be displaced with a continuous movement, that is to say with the aforementioned timer not being used.

The chains (56) are provided with a further projection (95) such that, when the bar (58) is resting on the bin ($B_1$) to be lifted, it trips a microswitch (96) so that the frame (34) can be tipped back into the horizontal position shown in FIG. 1. In this way, while the chains (56) contribute to the discharging of the bin ($B_1$), the frame (34) can rapidly go to accept and tip the subsequent bin ($B_2$), which immediately moves behind the preceding bin ($B_1$), the latter being, as stated, subjected to an inching forward movement.

This succession of phases is made possible by the presence of a continuous belt (61) (FIGS. 1, 9 and 10) mounted inclined (preferably through 120°) on the fixed frame, in alignment with the belt (38) when the oscillating frame (34) is in the inclined position.

The belt (61) is mounted rotatably on horizontal idle rollers, and it is displaced through friction by the bins being lifted.

The upper extremity of the belt (61) defines the lower side of the discharge aperture (32), the upper side of which is delimitated by a horizontal roller (62) mounted rotatably to idle on a fixed frame (63) that protrudes from the terminal part of the apparatus, in such a way as to place the roller (62) in alignment with the belt (61).

It is thus possible in this way for the products to be discharged continuously, since they are not dependent on the tipping times of the frame (34).

Figure 12:
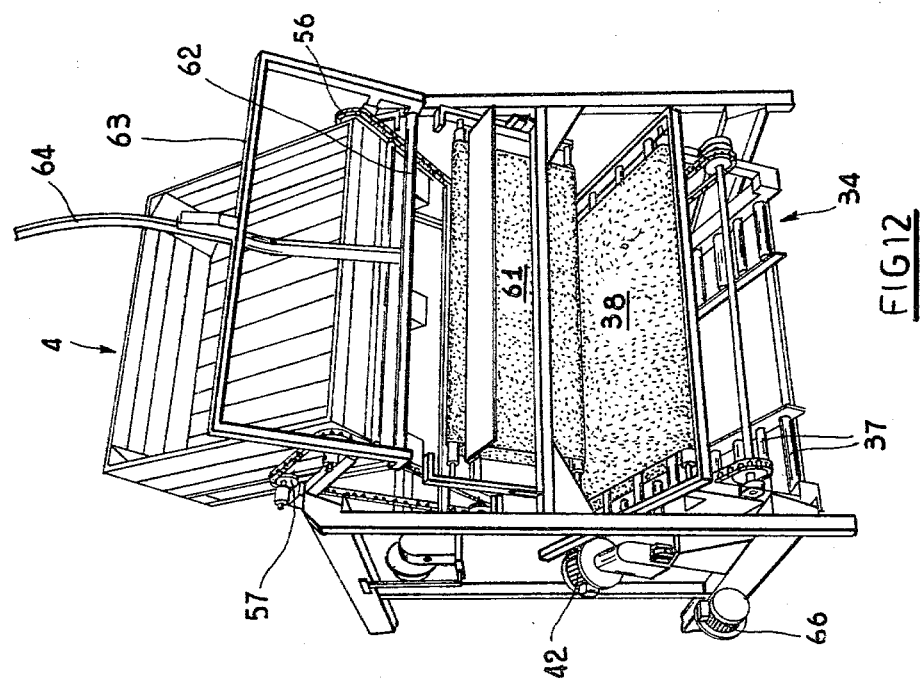
Figure 11:
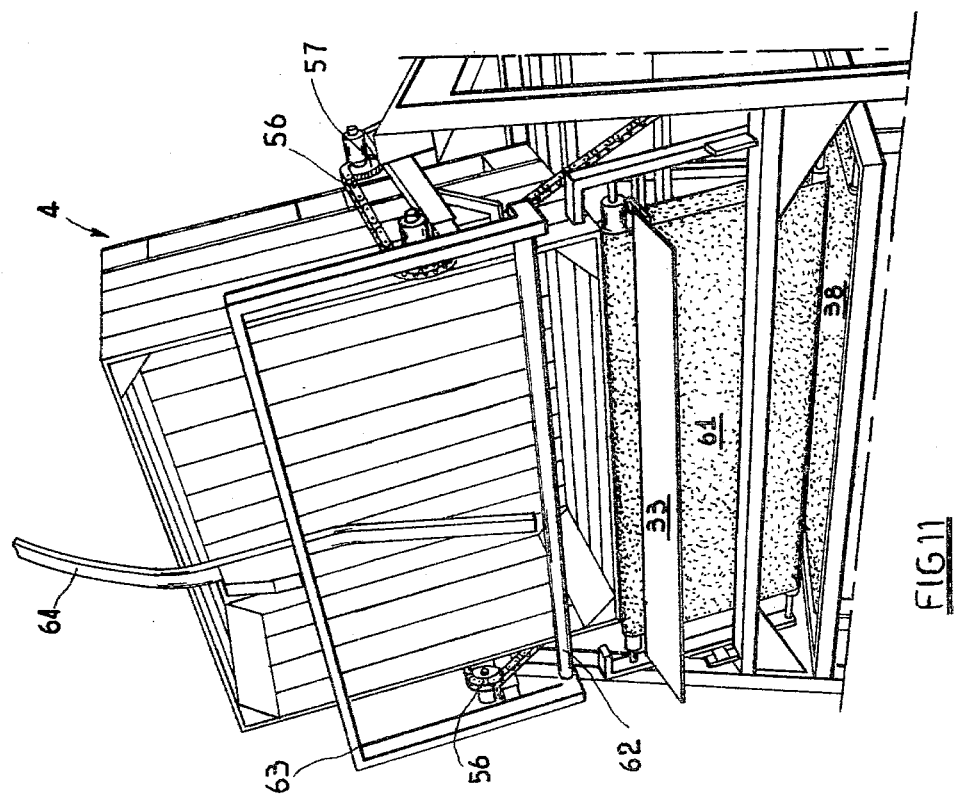

The fixed frame (63) is centrally integral with a bar (64) (FIGS. 1, 11 and 12) that extends in a mainly vertical direction and is approximately of "S" shape, this being provided to engage with the bins during the final lifting phase, in order to determine the tipping onto the upper platform (3), as will be seen hereinafter.

So as to prevent the bins from dropping too violently onto the upper platform (3) after the tipping procedure is over, the driving shaft (12a) of the conveyor (12) is provided in the center with an oscillating bar (65) (FIG. 19) which, under non-operative conditions, is arranged vertically through the action of a counterweight (65a) integral therewith.

More precisely, the bar (65) is integral with the external part of a free wheel, the inside part of which is keyed onto the shaft (12a), in such a way that the bar can follow with a controlled movement, when subjected to a thrust, the movement of the shaft (12a) and, when left free, return to the vertical non-operative position, under the action of the counterweight (65a).

The operation of the apparatus according to the invention is as described hereunder:

With reference to the path followed by a bin, first of all it is made to move forward from the de-stacker group (positioned in the region of the stanchions (13)) onto the conveyor (9) (FIG. 13) which, in turn, through the motor (66) (FIG. 6) pushes it into the oscillating frame (34) which is set ready in the horizontal position.

To be inserted in the frame, the bin slides over the roller surface (37) until it reaches the fully inserted position (FIG. 14), detected by a photocell (90) (FIGS. 6 and 7), which actuates the motor (48) for the tipping operation, through the rack (45), of the oscillating frame carrying the bin.

A photocell (67) causes the conveyor (9) to halt when the presence of a bin (B3) obscures the photocell and when the oscillating frame is not in the horizontal position, that is to say, when the microswitch (51) is not tripped.

Tipping ceases automatically once the frame has reached the inclined position (FIG. 15), and the bin goes and rests on the transversely mounted bar (44) integral with the chains (39), the bar having previously been positioned ready for the commencement of the cycle, as illustrated in FIGS. 13, 14 and 15.

At this juncture, the motor (42) that drives the chains (39) is set in motion in order to lift the bar (44) and to thus push the bin upwards, as shown in FIG. 16.

Contemporaneously with the movement of the chains (39), the movement also occurs of the belt (38) that seals the open side of the bin and moves with it at the same speed.

In this way, the bin is raised while sliding between the roller surface (37) and the belt (38), the latter sealing the open side of the bin so that the products cannot overspill therefrom.

The same function is also performed by the belt (61) to which the bin is firmly attached during the first lifting phase.

Once the upper part of the bin begins to go beyond the belt (61) (FIG. 9), the products contained therein start to be discharged by gravity through the discharge aperture (32), that is to say, over the chute (33), immediately underneath which a conveyor belt (not illustrated) can be placed to carry the products to the selection station or to some other work station.

With the intermittent rotation of the chains (39), the bar (44) integral therewith pushes the bin upwards right into the position shown in FIG. 17, while the discharging of the products (facilitated by the intermittent lifting of the bin) continues, after which the device (53) starts to operate and this, with the movement of the chains (56), determines a further lift upwards.

In practice, when the bar (44) has reached the highest position, the movement of the chains (56) carries the bar (58) (integral with the chains) in engagement with the lower side of the bin (FIG. 17) so as to thrust it upwards, while the bar (44) is returned to its initial position.

While the bin continues to be lifted, preferably in an inching fashion, the motor (48) is again placed in operation, and this, through the rack (45) causes the oscillating frame (34) to be returned to the horizontal non-operative position, with the movement being the reverse of that described earlier on. Thus the arrangement shown in FIG. 18 is reached, whereby the frame (34) is ready to receive a subsequent bin, while the discharge phase of the bin that has been lifted continue, since the lower edge thereof has yet to go beyond the belt (61) (see also FIG. 11). Subsequently, the bin comes into contact with the top part of the shaped bar (64) which actuates the tipping of the bin.

The tipping operation (FIGS. 12 and 19) causes the empty bin, that is still being thrust upwards by the bar (58), first to be straightened and then to drop, bottom downwards, onto the upper platform in such a way as to adopt again the orientation it had at the time it was fed on the lower platform.

While the bin is inclined through the force of gravity on the upper platform, as shown with dashes in FIG. 19, it comes into contact with the bar (65) which, as stated, checks its movement and prevents too brusque a drop.

As the shaft (12a) gradually rotates, the bar (65) is lowered until it is arranged beneath the bin while this is resting horizontally on the conveyor (12) (FIG. 20).

The latter then carries the bin towards the stacker group and frees the bar (65) which, under the effect of the counterweight (65a), returns to the vertical non-operative position, ready to resume operating in the subsequent cycle. The halting of the conveyor (12) is controlled by a further photocell (105) (see FIG. 1).

The transversely mounted bar (58) then continues its movement until it is halted in the cycle commencement position shown in FIG. 20 ready for subsequent operation.

The operation of the apparatus proceeds in this way in a constant fashion, with the same cycle being repeated ad infinitum, while the consent for the various operations is automatically given, as has been seen, by microswitches and photocells suitably positioned along the path followed by the bins.

Naturally the invention is not limited purely to the above described form of embodiment and numerous modifications and variants, all falling within the concept of the invention, are possible.

Just as an example, both the tipping of the oscillating frame and the lifting of the bins can be achieved with suitably arranged flow dynamics cylinders, or other equivalent means.

What is claimed is:

1. Automatic apparatus for discharging loose products contained in bins, particularly fruit, vegetables and the like, comprising on a fixed frame:
    a lower platform for feeding in full bins and an upper platform for discharging empty bins;
    an oscillating frame for receiving the full bins and positioned in the region of said lower platform and able to be tipped alternately from a virtually horizontal non-operative position in alignment with said lower platform, to a position in which the discharge of the products contained in the bins is prepared, said latter position requiring a rotation of more than 90° with respect to the non-operative position;

means for causing the oscillating frame to be tipped in one direction or the other;

means mounted on said oscillating frame for restraining the products inside the bins at the time said frame is in an inclined position;

first transfer means mounted on said oscillating frame for lifting the full bins while said frame is in the inclined position;

a fixed discharge aperture placed a certain height above said oscillating frame, in alignment with an open side of the bins when they are in the inclined position in which the products are discharged;

a second transfer means mounted on said fixed frame, above said oscillating frame, for lifting the bins further up and tightly against said discharge aperture, after the lifting operation performed by said first transfer means;

locator means placed in the region of said second transfer means and said upper discharge platform, for overturning the empty bins from the inclined position to the virtually horizontal position, above said upper platform, in which the orientation of the empty bins corresponds to that of the full bins being fed in;

and means for detecting various positions adopted gradually by the bins, so as to coordinate the operation of said transfer means and said means for tipping the oscillating frame.

2. Apparatus according to claim 1, comprising: a de-stacker group for the full bins, placed upstream of the oscillating frame, in the region of said lower platform, in order to supply said oscillating frame with one bin at a time removed from a stack of full bins deposited on said lower platform, and a stacker group for the empty bins, placed in the region of the upper platform for the discharge of the empty bins, in order to form the individual empty bins, lifted up by said second transfer means, into stacks above said upper platform, said groups comprising virtually horizontal conveyor belts, movable intermittently, in the region of said lower and said upper platform, and lifting mechanism that cooperates with said conveyor belts for selectively lifting and lowering the bins vertically into the feeding and the discharge position.

3. Apparatus according to claim 1 or 2, wherein said oscillating frame is constituted by a structure, essentially in the form of a cage, that can be overturned around a fixed transversely mounted central shaft, virtually perpendicular to the direction in which the bins move forward on the lower platform.

4. Apparatus according to claim 1 or 2, wherein said oscillating frame has a bottom provided with a roller surface to be aligned, in the non-operative position, with said lower platform and a top, with a continuous belt parallel to said roller surface, at a distance away therefrom equal to the height of the bins, provided in order to prevent the products contained therein from overspilling during phases preceding the discharge of the products.

5. Apparatus according to claim 1 or 2, wherein said first transfer means is constituted by a pair of endless means, mounted in alignment one with the other on the two sides of the oscillating frame and operated by corresponding drive means supported by said oscillating frame, said endless means being fixed to a transversely mounted bar adapted to engage with the ends of the bins, in order to lift them, when the oscillating frame is in the inclined position.

6. Apparatus according to claim 4, wherein said continuous belt is operated at the same movement speed as said endless means.

7. Apparatus according to claim 1 or 2, comprising a further belt for retaining the products in the bins, said further belt being mounted inclined on said fixed frame, aligned with said belt mounted on the oscillating frame when the latter is in the inclined position, said further belt being positioned beneath said discharge aperture.

8. Apparatus according to claim 1 or 2, wherein said second transfer means mounted on the fixed frame comprise a pair of endless chains, placed on both sides, horizontally aligned one with the other and arranged to define one and the same path, said chains having fixed to them a transversely mounted bar adapted to engage with the ends of the bins in order to thrust them upwards, after the lifting operation carried out by said first transfer means, a motor assembly being provided for operating said chains.

9. Apparatus according to claim 1 or 2, comprising means for providing said first and said second transfer means with intermittent movement, so as to render gradual the discharge of the products through said discharge aperture.

10. Apparatus according to claim 1 or 2, wherein fixed, shaped, means are provided at the top of said second transfer means for turning the bins over in the final stage of the lifting operation, and for causing them to drop onto the upper platform, with their orientation being that at the time they were fed on the lower platform.

11. Apparatus according to claim 1 or 2, wherein oscillating means connected through a free wheel system to a horizontal driving shaft are mounted at the top of said upper platform; said oscillating means being located along the path followed by the bins during the tipping phase on the upper platform, so as to check, through said free wheel system, their drop; means being provided for returning said oscillating means to the non-operative position, once the discharged bin has been sent forward.

12. Apparatus according to claim 2, wherein said lower and said upper platform are provided with a plurality of horizontal conveyors placed one on an extension of the other, and operable independently, said stacker group and said de-stacker group being mounted in the region of intermediate ones of said horizontal conveyors.

13. Apparatus according to claim 2 or 12, wherein said stacker group and said de-stacker group each comprise a pair of lateral slides, displaceable alternately in a vertical direction, and provided with oscillating brackets that are able to be inserted in between one bin and another, in order to selectively lift and lower said bins, control means being provided for operating said slides and for displacing said oscillating brackets.

14. Apparatus according to claim 5, wherein said continuous belt is operated at the same movement speed as said endless means.

15. Apparatus according to claim 8, wherein said path is triangular.

16. Apparatus according to claim 11, wherein said oscillating means is connected to a driving shaft of said upper platform conveyor next to said second transfer means.

17. Apparatus according to claim 5, wherein said endless means are chains.

* * * * *